Sept. 15, 1942.  W. G. PONTIS  2,296,221
CLAMP
Filed April 10, 1941

INVENTOR
WILLIAM G. PONTIS
BY
his ATTORNEYS

Patented Sept. 15, 1942

2,296,221

UNITED STATES PATENT OFFICE 2,296,221

CLAMP

William G. Pontis, Dayton, Ohio, assignor to General Motors Corporation, Detroit, Mich., a corporation of Delaware Application April 10, 1941, Serial No. 387,988

9 Claims. (Cl. 248—26)

This invention relates to improvements in clamping means and means for connecting the same with a support.

An object of the present invention is to provide a clamping member and supporting means therefor so constructed that the clamping member may be easily connected with and disconnected from the support.

Another object of the present invention is to provide a one-piece clamping member and supporting means therefor so constructed that the clamping member may be securely connected with the support by merely pressing the clamping member into place without employing extraneous fastening devices.

Another object of the present invention is to provide a clamping member in which the arms thereof are so constructed and formed so as to be capable of compressing a shock absorbing element about a unit when it is assembled to the support and at the same time exert a continuous wedging action against one or more edge portions of the support recess receiving the unit so as to insure maintenance of the parts in proper assembled relation under all conditions when in use.

Another object of the invention is to provide a motor mounting holding device of simple and streamlined construction.

Further objects and advantages of the present invention will be apparent from the following description, reference being had to the accompanying drawing wherein a preferred embodiment of the present invention is clearly shown.

Figure 1:
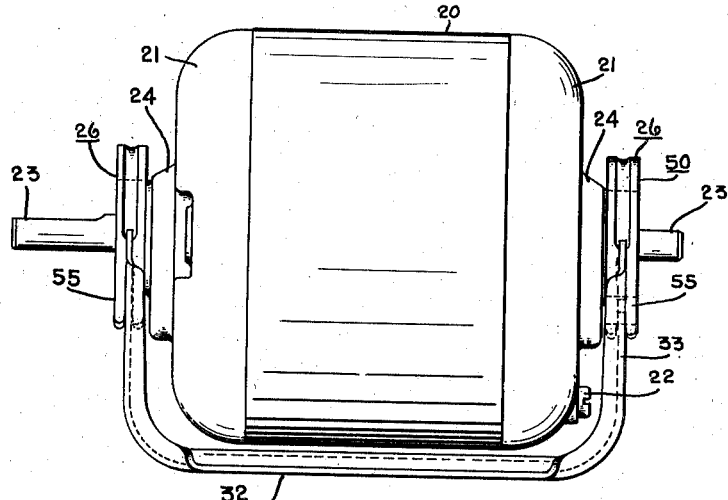
Fig. 1 is a side elevational view of a clamping member mounting supporting an electric motor on a support.

Referring to the drawing 20 designates the motor frame having end members 21 secured to the frame by bolts 22. A rotating member, not shown, is mounted on to a shaft 23 the ends of which are journalled in bearing bosses 24 formed integral with the end members 21. The vibrations of the motor are cushioned by shock absorbing assemblies 26 each comprising an inner metal ring 27, a soft rubber annulus or ring 29 and a split outer metal ring 30. The ring 30 is provided with spaced opening 31, clearly shown in Fig. 2. In the present instance the metal rings are preferably bonded to the rubber annulus. An assembly 26 is prererably press fitted over each boss 24.

The motor 20, with the assemblies 26 attached to the bosses, is adapted to be mounted upon a cradle or U-shaped member having a base 32 provided with two angular arms or supports 33. Each arm 33 is formed with a recess 34 opening to one side thereof to provide spaced ends 35. Spaced tongues 36 extend upwardly from the bottom edge of the recess. The recess 34 is also provided with spaced projections 37 each having a shoulder 38 on each side of a divisional line of the angular supports 33. These projections are formed by notching the supports to provide narrow portions 39 opening to the edge of the recess 34. It will be noted that the projections or ears 37 are provided with arcuate camming surfaces 40.

In mounting the motor upon the cradle the openings 31 in the split rings 30 will receive the tongues 36 of the support so as to center the motor thereon relative to the support.

The motor bosses are held in the recesses of the supports by one-piece U-shaped clamping members 50. Each clamping member is provided with a yoke portion 51 having an inwardly extending rib 52 and a pair of arms 53. The free end of the arms is provided with a slot 54 to provide spaced prongs 55, the free ends of which are bent outwardly to provide angled portions to act as guide means for the clamping member when it is assembled to the support. The arms 53 are also provided with an opening 56 spaced from the slots by a partition 57.

Figures 3, 4:
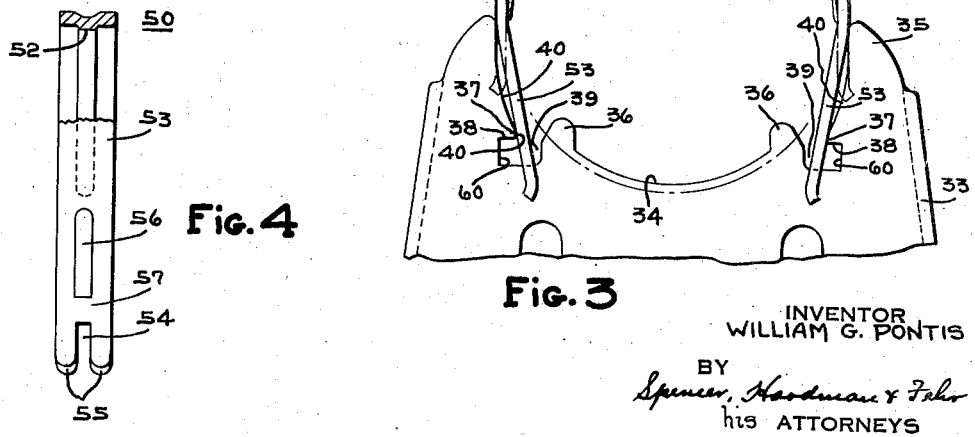
Fig. 3 is a view showing the various steps in assembling the clamp to the support.
Fig. 4 is a detail view partly in section of the clamping member.

According to the principles of the present invention the clamp 50 is mounted on the support by the simple act of pushing the same into position in the recess 34 so as to hold detachably the motor on the support. This as accomplished by, see Fig. 3, inserting the free end of the arms in the mouth of the recess so that the angled portions of the prongs 55 straddle the spaced ends 35 of the supports. These angled portions of the prongs 55 guide the clamp in a plane coincident with the plane of the support in its inward movement. As the clamp is moved inwardly, the outer surfaces of the partitions 57 engage their respective camming surfaces 40 of the ears 38 which urge the arms toward each other and at the same time the spaced ends of the outer ring 30 are urged toward each other compressing the rubber member 29 in all directions. When the clamp is moved inwardly the required distance the partitions 57 clear the ears 37 causing the arms to snap outwardly the openings 56 receiving the ears 37 with the upper edges of the partitions 57 located under the shoulders 38 to prevent accidental outward movement of the clamping member 50. It will be noted in Fig. 3 that certain walls which form the notches in the support are inclined toward each other away from the axis of the recess 34. These inclined surfaces are designated by numeral 60. If desired the shoulders 38 may be at right angles to the surfaces 60. These inclined surfaces are engaged by the outer surfaces of the partition 57 to prevent the arms from springing outwardly to their free normal positions. Thus the resilient member 29 is always held under a state of compression by the clamping member while the assembly 30 is in assembled relation with the support.

Figure 2:
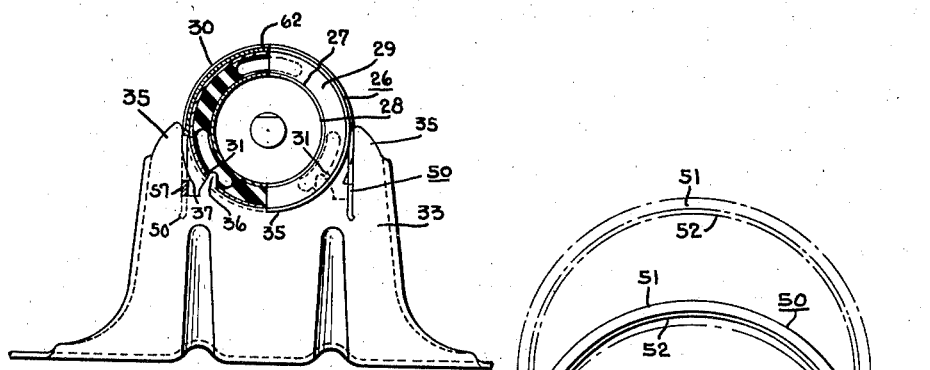
Fig. 2 is an end view, partly in section, showing the clamping member attached to a support.

When the clamping member 50 is in its home position, as shown in Fig. 2, a rib 52 formed in the yoke 51 fits into an annular groove 62 formed in the ring 30. This rib cooperates with the groove 62 to prevent axial movement of the motor relative to the support 30.

While the embodiment of the present invention as herein disclosed, constitutes a preferred form, it is to be understood that other forms might be adopted, all coming within the scope of the claims which follow.

What is claimed is as follows:

1. An assembly device comprising in combination; a support having a recess opening to one side thereof to receive an object, the edge of the recess having a plurality of notches opening to the edge of the recess to provide shouldered cams; a one piece resilient member adapted to hold the object in the recess, said member having support engaging ends adapted to be freely inserted at the mouth of the recess and forced over the cams, the resiliency of the arms permitting them to bend and thus store energy therein each end being formed with a slot to straddle the support and guide the member in a plane coincident with the plane of the support said ends having an opening to receive their respective cams and allow the arms to move toward their normal position whereby the resilient member is held on the support; and means provided by the support cooperating with the outer surfaces of the ends of the resilient member to prevent the ends from expanding to their free normal position.

2. An assembly device comprising in combination a support having a recess opening to one side thereof to receive an object, the edge of the recess having a plurality of notched openings to the edge of the recess to provide shouldered cams; a U-shaped member of stiff spring metal adapted to hold the object in the recess, the arms of said member adapted to be freely inserted at the mouth of the recess but forcible over the cams causing the arms to bend toward each other, each arm end being formed with a slot and an opening spaced a predetermined distance from the slot, said slots cooperating with the support to guide the member in a plane coincident with the plane of the support and said openings receiving respective cams to allow the arms to move toward their normal free positions whereby the member is detachably held on the support; and means provided by the support cooperating with the outer surfaces of the arms to prevent the arms from returning to their normal free positions.

3. An assembly device comprising in combination; a support having a recess opening to one side thereof to receive an object, the edge of the recess having a plurality of spaced notches opening to the edge of the recess to provide camming portions; a shock absorbing element about the object; a one-piece resilient member adapted to hold the object in the recess, said member having support engaging ends adapted to be freely inserted at the mouth of the recess and forced over the camming portion to move the arms in one direction to compress the shock absorbing element in all directions about the object, each end having a slot to straddle the support so as to guide the member in a plane coincident to the plane of the support, said ends also having openings spaced from the slots to receive respective camming portions to allow the arms to move in the opposite directions so as to permit partial expansion of the shock absorbing element whereby the resilient member is held detachably on the support, said shock absorbing element operating to urge the center portion of the resilient member outwardly and the ends laterally; and inclined walls provided by the notches engageable by the respective outer surfaces of the ends to prevent the ends from expanding to their normal positions whereby said ends maintain the shock absorbing element under compression.

4. In a motor assembly the combination of a motor having a boss; a support having an arcuate recess opening to one side of the support, the marginal wall of the recess having a pair of symmetrical notches opening to the normal free edge of the wall by narrow portions to provide hooks; a resilient soft rubber member about the boss adapted to be received by the recess; and a one-piece clamping member for compressing the resilient member about the boss and for retaining the boss within the recess, said clamping member having its ends provided with spaced angular portions for straddling respective portions of the support for guiding the clamping member in a plane confined to the plane of the support upon forcing the clamping member in the recess, each end of the clamping member having portions engaging the underside of their respective hooks to prevent accidental outward movement of the clamping member.

5. In a motor assembly the combination of a motor having a boss; a support having an arcuate recess opening to one side of the support, the marginal wall of the recess having a pair of symmetrical notches opening to the normal free edge of the wall by narrow portions to provide hooks, each notch having an inclined surface below the hook and inclined in opposite directions with respect to the vertical of the support and converging in a direction toward each other away from the axis of the recess; a resilient soft rubber member about the boss adapted to be received by the recess; and a one-piece metal clamping member for compressing the resilient member about the boss and for retaining the boss within the recess, said clamping member having its ends provided with spaced angular portions for straddling respective portions of the support for guiding the clamping member in a plane confined to the plane of the support upon forcing the arms over the hooks, the resiliency of the arms permitting them to bend in one direction and thus store energy therein which effects movement of the arm in the opposite direction, each end of the clamping member having portions engaging the underside of their respective hooks when the clamping member is moved a certain distance to prevent accidental outward movement of the clamping member, said arm engaging their respective inclined surface of the notches to prevent the arm from expanding to their normal position and thereby holding the resilient member under compression about the boss.

6. A clamping member for a support having an arcuate recess opening to one side thereof and having cut-out portions opening to the edge of the recess and arranged to provide shouldered ears comprising a one-piece U-shaped member of stiff resilient metal having bifurcated ends adapted to straddle portions of the support when the member is inserted in the mouth of the recess to guide the member in a plane coincident with the plane of the support, said ends also having openings spaced from the bifurcations to provide partitions, said partitions adapted to engage releasably the ears to secure the member to the support preventing its separation therefrom either vertically or laterally.

7. An assembly device comprising in combination; a support having an arcuate recess opening to one side thereof to receive an object, the edge of the recess having a plurality of spaced notches opening to the edge of the recess to provide shouldered cams; a U-shaped member of stiff spring metal adapted to hold the object in the recess, each arm of said member having a slot for straddling the support to guide the clamp when it is assembled to the support and an opening spaced from the notch by a partition, each partition cooperating with its respective cam to urge the arm toward the other when the member is forced into the mouth; the resiliency of the arms permitting them to bend and thus store energy therein which effects movement of the arms toward their normal position to move the partition under the cams for securing the object to the support when the openings receive the cams; and means for preventing the arms from returning to their normal free position.

8. In an assembly device, the combination with a support having an arcuate recess opening to one side thereof, the marginal edge of the recess having a pair of symmetrical notches opening to the edge of the recess by narrow portions to provide camming ears; a U-shaped member of spring metal, the free ends of the arms adapted to be freely inserted in the entrance of the recess but forcible over the camming ears, the resiliency of the arms permitting them to bend in one direction and thus store energy therein which effects movement of the arms in the opposite direction, said arms having provisions for receiving the ears when the U-shaped member is moved a predetermined distance in the recess to allow said arms by their own resiliency to move in said opposite direction to shift said provisions under the ears to prevent accidental outward movement of the U-shaped member.

9. An assembly device comprising in combination; a support having a concave recess opening to one side thereof to receive an object, the edge of the recess having spaced notches opening to the edge of the recess to provide ears having shoulders; a body of resilient material about the object; a one-piece U-shaped member of stiff spring metal adapted to compress the resilient body about the object and to hold the object within the recess, the free ends of the arms of the U-shaped member adapted to be inserted in the mouth of the recess said ends being forced toward each other when forced against the edges of the recess to compress the resilient body, each arm of the member having a slot spaced a certain distance from the ends to provide a partition, said slots receiving the ears to permit the expansion of the resilient body and arms to move toward their free normal positions and move the partitions under the shoulders to hold the member to the supports; and means provided by the support cooperating with the partitions to prevent the arms from expanding to their normal free partitions and thereby hold the resilient body under compression.

WILLIAM G. PONTIS.